Sept. 30, 1941.   R. E. CORNWELL   2,257,108
HYDRAULIC DRIVING AND DIFFERENTIAL MECHANISM FOR VEHICLES
Filed Aug. 8, 1939   2 Sheets-Sheet 1
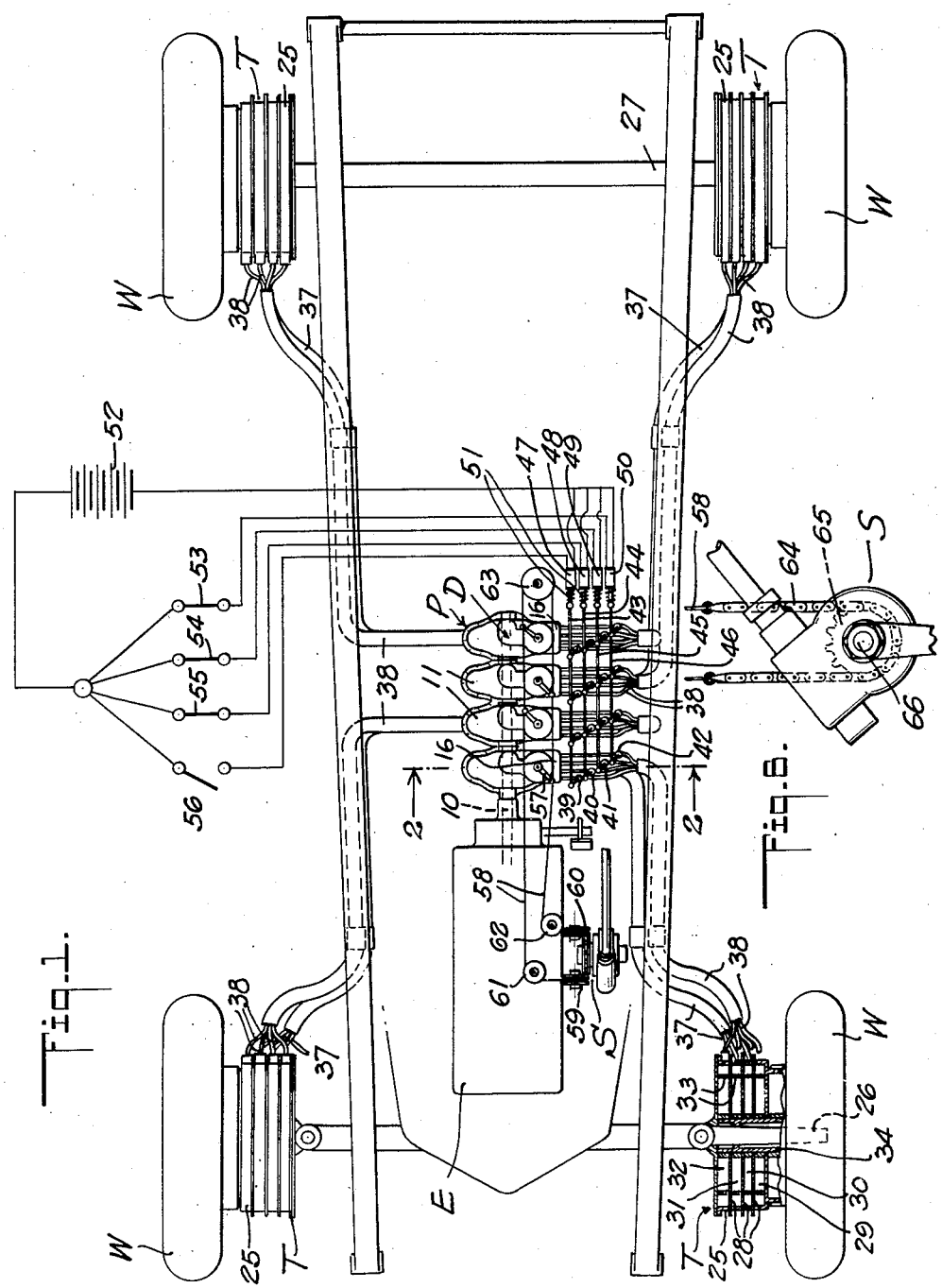
INVENTOR
RALPH E. CORNWELL
BY
Anderson & Liddy
ATTORNEYS Sept. 30, 1941.   R. E. CORNWELL   2,257,108
HYDRAULIC DRIVING AND DIFFERENTIAL MECHANISM FOR VEHICLES
Filed Aug. 8, 1939   2 Sheets-Sheet 2
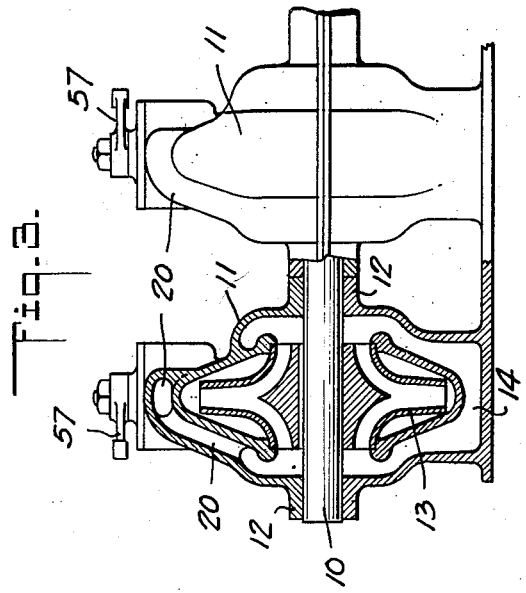
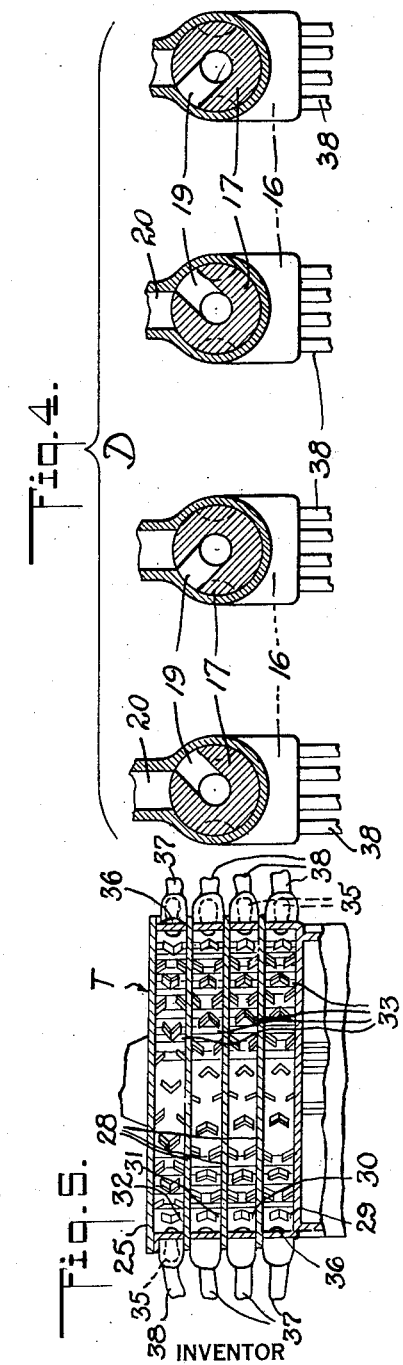
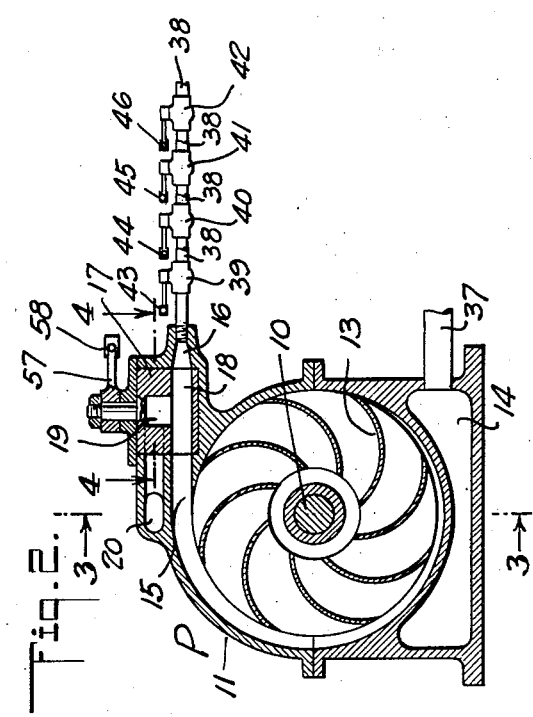
INVENTOR
RALPH E. CORNWELL
BY
ATTORNEY Patented Sept. 30, 1941

2,257,108

UNITED STATES PATENT OFFICE 2,257,108

HYDRAULIC DRIVING AND DIFFERENTIAL MECHANISM FOR VEHICLES

Ralph E. Cornwell, La Canada, Calif.

Application August 8, 1939, Serial No. 288,946

6 Claims. (Cl. 180—17)

This invention relates generally to vehicles and more particularly to mechanism for driving automotive and other vehicles.

An object of the invention is to provide a mechanism by which the wheels of a vehicle can be hydraulically driven in a manner to obtain a drive with high efficiency, smoothness, uniform distribution of power to the driven wheels, and great flexibility of control so as to obtain any desired speed within the range of power of the vehicle's engine, all to the end of simplifying the construction of the vehicle by dispensing with such complex and expensive mechanism as clutches, universal joints, propeller shaft and transmission and differential gearing.

Another object of the invention is to provide a hydraulic driving mechanism embodying means by which the effect of a differential mechanism can be obtained automatically in response to steering of the vehicle from a straight course, all without detracting from the efficient operation of the driving mechanism and yet compensating for the difference in linear speed between the inside and outside wheels in executing turns, so as to prevent premature wearing of the tires and skidding thereof on the road.

With these and other objects in view, the invention resides in the combinations and arrangements of elements as set forth in the following specification and particularly pointed out in the appended claims.

In the accompanying drawings,

Figure 1 is a diagrammatic plan view of an automobile chassis with one form of the invention applied thereto;

Figure 2 is a sectional view taken on the line 2—2 of Figure 1;

Figures 3 and 4 are sectional views taken on the lines 3—3 and 4—4, respectively, of Figure 2;

Figure 5 is a fragmentary plan view of a plurality of wheel turbines embodied in the invention with the casings of the turbines in section and the runners thereof in plan;

Figure 6 is a detail view of an operative connection between the steering mechanism and the hydraulic differential mechanism embodied in the invention.

Referring specifically to the drawings, the invention in a broad aspect comprises a hydraulic pumping unit P driven by the engine E of the vehicle and adapted to deliver liquid under pressure to turbine units T at the wheels W of the vehicle, all under the control of the operator, who can vary the amount of liquid delivered to the turbine units in accordance with the load thereof and the speed at which it is desired to drive the vehicle, the invention in a further broad aspect including a hydraulic differential mechanism D automatically controlled by the steering mechanism S of the vehicle.

For the purpose of illustration, a four wheel drive is shown and each wheel W is driven by a separate centrifugal pump of the unit P, the several pumps being operated from a common shaft 10 driven by the shaft of the engine E. As the pumps of the unit P are of identical construction, a description of one will suffice for all.

Each centrifugal pump is composed of a casing 11 in which the shaft 10 is journaled in bearings 12, the shaft having fixed thereto an impeller 13 which draws a suitable liquid, such as oil, from a sump 14 in the casing 11, and discharges the liquid under pressure from the casing through a port 15 to a distributing chamber 16, the flow of liquid to the latter being under certain conditions controlled by a rotary valve 17 forming part of the hydraulic differential mechanism D and including a delivery passage 18 and a by-pass passage 19 communicating therewith and adapted to be placed in communication with a return duct 20 to the pump 14, all for a purpose to later be fully described.

The turbine units T which can be of any well known type such as the impulse type are of identical construction, so that a description of one will suffice for all. Each unit T comprises a casing 25 fixed with respect to a front wheel spindle 26 or a rear wheel dead axle 27. The casing 25 is divided interiorly by partitions 28 into chambers 29, 30 and 31 and 32 in each of which works a bladed runner 33 fixed to the wheel hub 34. The chambers 29 to 32 correspond to the "low," "second," "high," and "reverse" gears, and each chamber is provided with a tangentially arranged nozzle 35, the nozzle and the blades on the runner for the "reverse" gear chamber 32 facing in the opposite direction to the corresponding parts of the remaining chambers. Each of the chambers is provided with a discharge port 36 to which is connected the flexible section of a return conduit 37 leading to the sump 14 of the respective pump casing 11 from which the liquid is pumped.

From each of the nozzles 35 leads the flexible section of a delivery conduit 38, the four delivery sections having rigid sections leading from the chamber 16 of the respective pump casing 11, and being provided with control valves 39, 40, 41 and 42, operatively connected by links 43, 44, 45 and 46, respectively, to the cores of solenoids 47, 48, 49 and 50, respectively. Thus four each of the valves 39, 40, 41 and 42 are provided, and each four valves are connected to a single link 43, 44, 45 or 46, so as to be actuated in unison upon energization of the respective solenoid 47, 48, 49 or 50.

The valves are urged to closed position by springs 51, and the solenoids are adapted to be energized from a battery 52 under the control of switches 53, 54, 55 and 56 to open the respective four valves 39, 40, 41 or 42.

Each of the rotary valves 17 for the differential mechanism D is provided with an arm 57 connected to an endless cable 58 trained over idler pulleys 59, 60, 61, 62 and 63 and including a chain link section 64 trained about a sprocket wheel 65 fixed to the steering shaft 66 of the vehicle's steering mechanism. The arrangement of the by-pass passages 19, as shown in Figure 4, causes the liquid being pumped to the wheel turbines to be by-passed to the sump 14 of the respective pump in such manner that less liquid will be delivered to the right or left wheel turbines according as a right or left turn is initiated and in such proportion to the radius of the turn that the identical effect of differential gearing will be obtained hydraulically in the operation of the invention, which is as follows:

With the engine E in operation and with the valves 39, 40, and 41 opened by closing the switches 53, 54 and 55, liquid from the pumps will be supplied to the chambers 29, 30 and 31 to apply maximum torque uniformly in a forward driving direction to the four wheels W, thus corresponding to "low" gear or maximum power for starting.

As the forward speed of the vehicle increases, two of the three switches 53, 54 and 55 are successively opened in accordance with the load and corresponding to "second" and "high" gear running conditions.

For "reverse" gear operation, the switches 53, 54 and 55 are all opened, and the switch 56 is closed to supply liquid to the chambers 32 of the four turbines, to apply torque to the wheels W in a rearward driving direction.

During any steering movement of the vehicle from a straight-ahead position, the hydraulic differential mechanism D will automatically operate to by-pass directly to the sumps 14, the necessary amount of liquid to compensate for the difference in linear speeds of the inside and outside wheels of the vehicle with respect to right or left steering movement of the wheels.

What is claimed is:

1. Hydraulic driving mechanism for automotive vehicles comprising co-axially arranged centrifugal pumps, one for each vehicle wheel to be driven, and having a common shaft adapted to be driven by the engine of the vehicle; turbine units co-axially related to each of the vehicle wheels to drive the latter and each including a plurality of forward driving turbines and a reverse driving turbine; conduits connecting the turbines of each unit with one of said pumps; and means by which the flow of liquid through said conduits can be controlled to selectively deliver liquid to any one or more of the turbines of each of said units simultaneously, to obtain a variable torque effect thereat.

2. Hydraulic driving mechanism for automotive vehicles comprising co-axially arranged centrifugal pumps, one for each vehicle wheel to be driven, and having a common shaft adapted to be driven by the engine of the vehicle; turbine units co-axially related to each of the vehicle wheels to drive the latter and each including a plurality of forward driving turbines and a reverse driving turbine; conduits connecting the turbines of each unit with one of said pumps; valves, one for each of said conduits; a plurality of means operatively connecting said valves to open the valves for the corresponding turbines of all of said units simultaneously; and means for selectively actuating the last means to deliver liquid to any one or more of the turbines of all of said units simultaneously.

3. Hydraulic driving mechanism for automotive vehicles comprising: co-axially arranged centrifugal pumps one for each vehicle wheel to be driven, and having a common shaft adapted to be driven by the engine of the vehicle; turbine units co-axially related to each of the vehicle wheels to drive the latter and each including a plurality of forward driving turbines and a reverse driving turbine; conduits connecting the turbines of each unit with one of said pumps; valves, one for each of said conduits; a plurality of means operatively connecting said valves to open the valves for the corresponding turbines of all of said units simultaneously; means urging the valves closed; solenoids co-acting with said operative connecting means to open said valves for the supply of liquid to any one or more of the turbines of all of said units simultaneously; and electrical circuits including said solenoids, a source of current supply and switches operable to selectively energize the solenoids.

4. Hydraulic driving mechanism for automotive vehicles comprising: co-axially arranged centrifugal pumps, one for each vehicle wheel to be driven, and having a common shaft adapted to be driven by the engine of the vehicle; turbine units each including a plurality of turbines each having co-axially related runners operatively connected to each of the vehicle wheels to drive the latter; and means by which liquid under pressure from said pumps can be delivered to the respective turbine units to apply torque to one or more of the runners of the units simultaneously, whereby to vary the torque applied to the wheels.

5. Hydraulic driving mechanism for automotive vehicles comprising: co-axially arranged centrifugal pumps, one for each vehicle wheel to be driven, and having a common shaft adapted to be driven by the engine of the vehicle; turbine units each composed of a plurality of chambers having co-axially arranged runners operatively connected to each of the vehicle wheels to drive the latter; liquid delivery and return conduits connecting the chambers to the respective pumps; and means including valves in the delivery conduits by which liquid can be supplied to one or more chambers of the turbine units simultaneously to vary the torque applied to the vehicle wheels.

6. Hydraulic driving mechanism for automotive vehicles comprising: co-axially arranged centrifugal pumps, one for each vehicle wheel to be driven, and having a common shaft adapted to be driven by the engine of the vehicle; turbine units co-axially related to each of the vehicle wheels to drive the latter and each including a plurality of forward driving turbines and a reverse driving turbine; conduits connecting the turbines of each unit with one of said pumps; means by which the flow of liquid through said conduits can be controlled to selectively deliver liquid to any one or more of the turbines of said units simultaneously, to obtain a variable torque effect thereat; and means co-acting with said pumps to by-pass liquid from those pumps supplying liquid to the turbines of the right or left wheels, according as a right or left hand turn is executed, so as to produce the effect of a differential mechanism.

RALPH E. CORNWELL.